US008704884B2

(12) United States Patent
Hiddink et al.

(10) Patent No.: US 8,704,884 B2
(45) Date of Patent: Apr. 22, 2014

(54) AUTOSTEREOSCOPIC DISPLAY DEVICE

(75) Inventors: Martin Gerard Hendrik Hiddink, Eindhoven (NL); Siebe Tjerk De Zwart, Eindhoven (NL); Oscar Hendrikus Willemsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1446 days.

(21) Appl. No.: 12/097,776

(22) PCT Filed: Nov. 28, 2006

(86) PCT No.: PCT/IB2006/054489
§ 371 (c)(1),
(2), (4) Date: Jun. 17, 2008

(87) PCT Pub. No.: WO2007/072250
PCT Pub. Date: Jun. 28, 2007

(65) Prior Publication Data
US 2008/0297594 A1 Dec. 4, 2008

(30) Foreign Application Priority Data

Dec. 20, 2005 (EP) .................................... 05112535
Mar. 24, 2006 (EP) .................................... 06111677

(51) Int. Cl.
*H04N 13/00* (2006.01)
(52) U.S. Cl.
USPC ............................................. 348/59; 348/42
(58) Field of Classification Search
USPC ...................................................... 348/59, 42
See application file for complete search history.

(56) References Cited

U.S. PATENT DOCUMENTS

| 6,069,650 | A | 5/2000 | Battersby | |
|---|---|---|---|---|
| 7,423,796 | B2 * | 9/2008 | Woodgate et al. | 359/237 |
| 7,532,272 | B2 * | 5/2009 | Woodgate et al. | 349/95 |
| 7,796,318 | B2 * | 9/2010 | Woodgate et al. | 359/237 |

(Continued)

FOREIGN PATENT DOCUMENTS

| GB | 2196166 A | 4/1988 |
|---|---|---|
| GB | 2398130 A | 8/2004 |
| WO | 9821620 A1 | 5/1998 |
| WO | 03015424 A2 | 2/2003 |

OTHER PUBLICATIONS

Driving Method for Switchable 2D/3D Lenticulars, Anonymous, IP.com Journal, IP.com Inc., West Henrietta, NY, US, Published Mar. 1, 2005.

*Primary Examiner* — Kenneth Coulter
(74) *Attorney, Agent, or Firm* — Larry Liberchuk

(57) ABSTRACT

A switchable autostereoscopic display device comprising: a display panel having an array of display pixels for producing a display, the display pixels being arranged in rows and columns; an array of lens elements arranged over the display panel for directing the light output of the display pixels so as to provide a stereoscopic image, the lens elements comprising an electro-optic material whose refractive index is switchable by selective application of an electric field between a first value that maintains the light output directing function and a second value that removes the light output directing function; and electrode arrangements provided above and below the lens elements for applying the electric field across the lens elements. At least one of the electrode arrangements comprises first and second electrode layers separated by a dielectric layer, and each electrode layer comprises a plurality of parallel elongate electrodes separated by gaps. The electrodes of each electrode layer are aligned with the gaps of the other electrode layer. In this way, the effect of the gaps on the electric field in the lens elements is reduced.

10 Claims, 3 Drawing Sheets

(56) References Cited

U.S. PATENT DOCUMENTS

| | | | |
|---|---|---|---|
| 8,059,216 B2* | 11/2011 | Hiddink et al. | 349/15 |
| 2002/0070909 A1 | 6/2002 | Asano et al. | |
| 2005/0099689 A1 | 5/2005 | Fukushima et al. | |
| 2006/0098296 A1* | 5/2006 | Woodgate et al. | 359/642 |
| 2007/0035829 A1* | 2/2007 | Woodgate et al. | 359/462 |
| 2008/0266388 A1* | 10/2008 | Woodgate et al. | 348/59 |

* cited by examiner

AUTOSTEREOSCOPIC DISPLAY DEVICE

This invention relates to an autostereoscopic display device of the type that comprises a display panel having an array of display pixels for producing a display and a plurality of imaging means, such as lenticular elements, arranged over the display panel and through which the display pixels are viewed.

A known autostereoscopic display device is described in GB 2196166 A. This known device comprises a two dimensional liquid crystal display panel having a row and column array of display pixels acting as a spatial light modulator to produce the display. An array of elongate lenticular elements extending parallel to one another overlies the display pixel array, and the display pixels are observed through these lenticular elements. The lenticular elements are provided as a sheet of elements, each of which comprises an elongate semicylindrical lens element. The lenticular elements extend in the column direction of the display panel, with each lenticular element overlying a respective group of two or more adjacent columns of display pixels.

In an arrangement in which, for example, each lenticular element is associated with two columns of display pixels, the display pixels in each column provide a vertical slice of a respective two dimensional sub-image. The lenticular sheet directs these two slices and corresponding slices from the display pixel columns associated with the other lenticular elements, to the left and right eyes of a user positioned in front of the sheet, so that the user observes a single stereoscopic image. The sheet of lenticular elements thus provide a light output directing function.

In other arrangements, each lenticular element is associated with a more than two adjacent display pixels in the row direction. Corresponding columns of display pixels in each group are arranged appropriately to provide a vertical slice from a respective two dimensional sub-image. As a user's head is moved from left to right a series of successive, different, stereoscopic views are perceived creating, for example, a look-around impression. The above described device provides an effective three dimensional display. However, it will be appreciated that, in order to provide stereoscopic views, there is a necessary sacrifice in the horizontal resolution of the device. This sacrifice in resolution is unacceptable for certain applications, such as the display of small text characters for viewing from short distances. For this reason, it has been proposed to provide a display device that is switchable between a two-dimensional mode and a three-dimensional (stereoscopic) mode.

In the two-dimensional mode, the lenticular elements of the switchable device operate in a "pass through" mode, i.e. they act in the same way as would a flat sheet of optically transparent material. The resulting display has a high resolution, equal to the native resolution of the display panel, which is suitable for the display of small text characters from short viewing distances. The two-dimensional display mode cannot, of course, provide a stereoscopic image.

In the three-dimensional mode, the lenticular elements of the switchable device provide a light output directing function, as described above. The resulting display is capable of providing stereoscopic images, but also suffers the inevitable resolution loss mentioned above.

In order to provide switchable display modes, the lenticular elements of the switchable device are formed of an electro-optic material, such as a liquid crystal material, having a refractive index that is switchable between two different values for polarized light. The device is then switched between the modes by applying an appropriate electrical potential to electrode layers provided above and below the lenticular elements. The electrical potential alters the refractive index of the lenticular elements in relation to that of an adjacent optically transparent layer. Alternatively, the adjacent optically transparent layer may be formed of the electro-optic material, with the same result that the refractive index of the lenticular elements in relation to the optically transparent layer is altered.

It has been recognized that it is desirable to be able to provide a switchable autostereoscopic display device in which discrete portions of the display area can be switched either alone, or in combination, between two-dimensional and three-dimensional display modes. In this way, one or more two-dimensional display windows can be provided in a three-dimensional display, or vice versa one or more three-dimensional display windows can be provided in a two-dimensional display.

Such a display device can be achieved by providing electrode layers that each comprise a plurality of discrete electrodes, and using an addressing scheme to provide an electrical potential to specific combinations of the electrodes. However, it has been found that discrete electrodes can result in brightness non-uniformities, such as stripes or moiré-like patterns, across the display area.

According to the invention, there is provided a switchable autostereoscopic display device comprising: a display panel having an array of display pixels for producing a display, the display pixels being arranged in rows and columns; an array of lens elements arranged over the display panel for directing the light output of the display pixels so as to provide a stereoscopic image, the lens elements comprising an electro-optic material whose refractive index is switchable by selective application of an electric field between a first value that maintains the light output directing function and a second value that removes the light output directing function; and electrode arrangements provided above and below the lens elements for applying the electric field across the lens elements, wherein at least one of the electrode arrangements comprises first and second electrode layers separated by a dielectric layer, each electrode layer comprising a plurality of electrodes separated by gaps, the electrodes of each electrode layer being aligned with the gaps of the other electrode layer, such that the effect of the gaps on the electric field in the lens elements is reduced.

By providing an electrode arrangement comprising two electrode layers separated by a dielectric layer, it has been found that a more consistent electric field can be achieved within the lens elements. In particular, the more consistent electric field is achieved by arranging the electrodes of one layer to coincide with the gaps of the other layer. The electrodes not only generate the electric field, but also shield the lens elements from environmental electric fields.

A more consistent electric field within the lens elements enables more consistent refractive index switching (for light from the display), and a corresponding reduction in brightness non-uniformities, such as stripes or moiré-like patterns, across the display area.

Thus, the invention provides a display device having a display area which is locally switchable between two-dimensional and three-dimensional display modes, and in which the effect of electrode layer discontinuities on the quality of the display is minimal in either mode.

The electrodes are preferably parallel elongate electrodes.

The electrodes may be electrically connected together in adjacent pairs, each pair comprising an electrode of each electrode layer. In this case, no additional driving means are required, and, in use, the electrodes are addressed in the pairs. Alternatively, all of the electrodes of the electrode layer positioned further from the lens elements may be electrically connected together. In this case, additional driving means are required for providing a electric potential to the electrodes, and the electric potential may be "tuned" to provide optimal refractive index switching of the lens elements.

The electrodes of each electrode layer are preferably at least as wide as the gaps of the other electrode layer. In this way complete coverage of the display area by electrodes is achieved.

A minimum spacing between the electrode layers of the electrode arrangement is preferably in the range 1 µm to 100 µm, although other values may be appropriate. The dielectric layer between the electrodes may comprise any optically transparent insulator.

First and second ones of the electrode arrangements may face profiled (for example, either convex or concave) and substantially flat surfaces of the lens elements, respectively.

Electrodes of the first electrode arrangement may be provided perpendicular to electrodes of the second electrode arrangement.

The second electrode arrangement may comprise the first and second electrode layers separated by the dielectric layer, as described above, and the first electrode arrangement may simply comprise a single electrode layer.

The array of lens elements may comprise an array of parallel lenticular lens elements, with each element overlying several display pixels substantially in the row direction. When the elements provide the light output directing function, the light output from different ones of the pixels are projected in different directions by the lenticular lens elements to enable a stereoscopic image to be perceived.

The electro-optic material may comprise a liquid crystal material, such as nematic liquid crystal. The refractive index, for light of a defined polarization, of liquid crystal materials is readily switchable under the influence of an electric field.

The electrode layers may comprise indium tin oxide (ITO), which has suitably high conductivity and optical transparency.

The display device may further comprise a controller arranged to selectively apply an electrical potential across the electrode layers for applying the electric field across the lens elements. The controller may be arranged to apply an alternating electrical potential across the electrode layers. The controller may be arranged to selectively apply the electrical potential to selected electrodes of the electrode layers, thereby switching the refractive index of a selected portion of the array of lens elements.

The display panel may be a liquid crystal display panel. The display pixels may have a rectangular shape, the longer edges of the display pixels extending in the column direction. The rows and columns of display pixels may be orthogonal. A display pixel is provided at every intersection of the display pixel rows and columns.

An embodiment of the invention will now be described, purely by way of example, with reference to the accompanying drawings, in which.

The invention provides a display device having a display area which may be switched between a two-dimensional display mode and a three-dimensional display mode. Switching between modes is achieved by applying an electric field across an array of lens elements formed from a liquid crystal material. In the two-dimensional mode, the lens elements behave as if they were an ordinary sheet of transparent material. In the three-dimensional mode, the lens elements provide a light output directing function so as to enable a stereoscopic image to be perceived. The electric field is applied across the lens elements using electrode layers spaced from the lens elements. The spacing of the electrode layers from the lens elements improves the consistency of the electric field within the lens elements.

Figure 1:
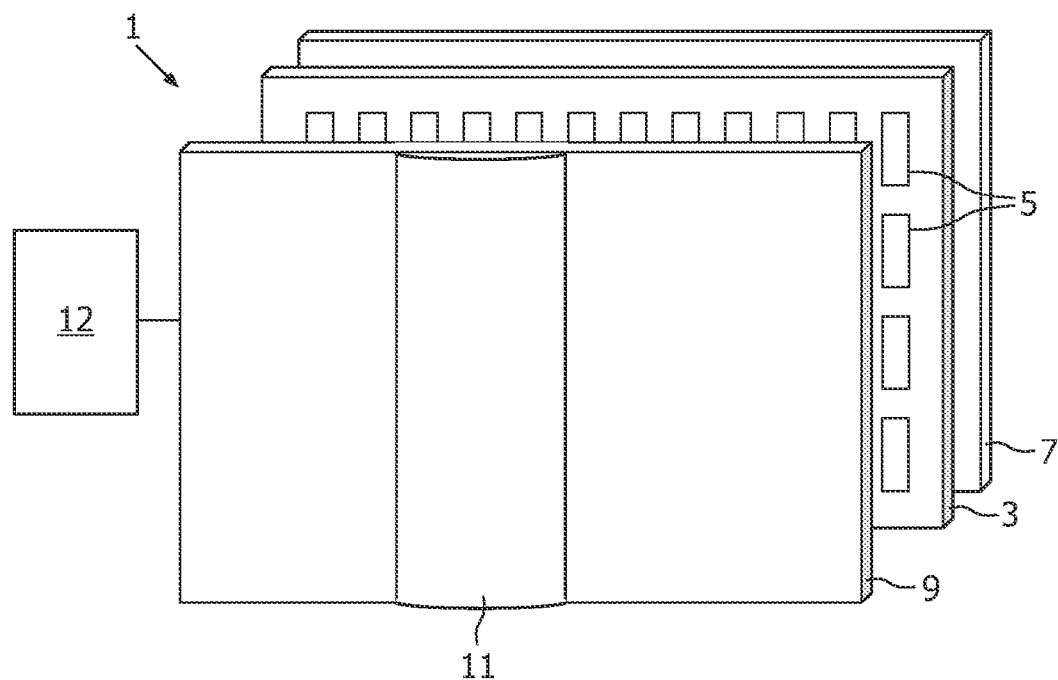
FIG. 1 is a schematic perspective view of a known autostereoscopic display device to which the invention can be applied.

FIG. 1 is a schematic perspective view of a known switchable autostereoscopic display device 1, and to which the invention can be applied. The display device 1 is shown in expanded form.

The known device 1 comprises a liquid crystal display panel 3 of the active matrix type that acts as a spatial light modulator to produce the display. The display panel 3 has an orthogonal array of display pixels 5 arranged in rows and columns. For the sake of clarity, only a small number of display pixels 5 are shown in the Figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the image by providing addressing signals to the switching elements, and suitable addressing schemes will be known to those skilled in the art.

The gaps between the display pixels 5 are covered by an opaque black mask. The mask is provided in the form of a grid of light absorbing material. The mask covers the switching elements and defines the individual display pixel areas.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular element arrangement 9, positioned over the display side of the display panel 3, which arrangement is controllable to selectively perform a view forming function. The lenticular element arrangement 9 comprises an array of lenticular elements 11 extending parallel to one another, of which only one is shown with exaggerated dimensions for the sake of clarity.

Figure 2:
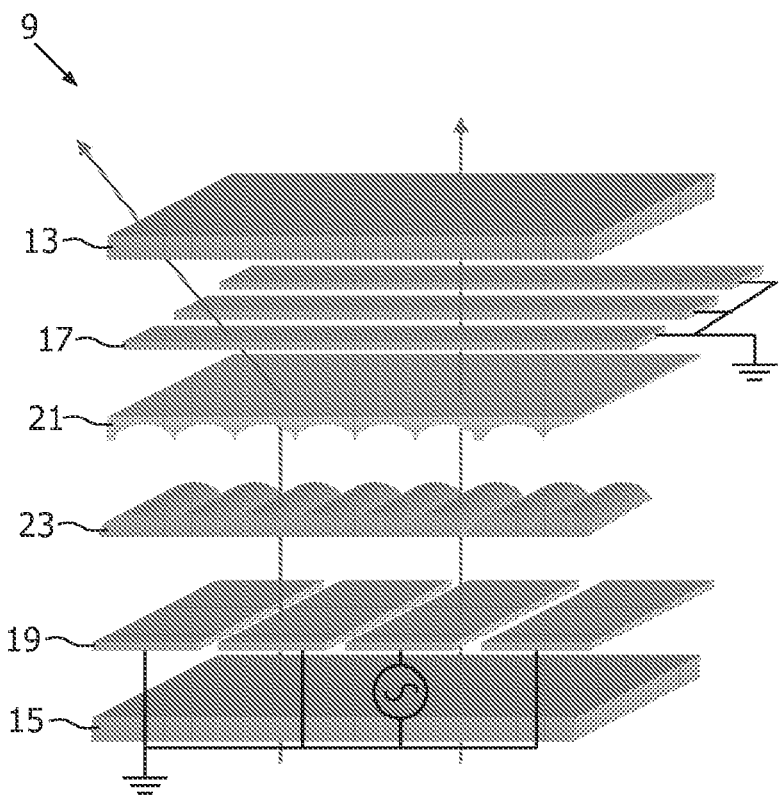
FIG. 2 is a detailed schematic view of an element of the known display device shown in FIG. 1.

The lenticular element arrangement 9 is shown schematically in more detail in FIG. 2. The arrangement 9 is shown in expanded form.

Referring to the Figure, it can be seen that the lenticular element arrangement 9 comprises a pair of transparent glass substrates 13, 15, with transparent electrode layers 17, 19 formed of indium tin oxide (ITO) provided on their facing surfaces. Each electrode layer 17, 19 is in the form of a plurality of parallel elongate electrodes, and electrodes of the respective different layers 17, 19 are arranged perpendicular to one another. The elongate electrodes are arranged with small gaps therebetween to enable them to be separately addressed.

An inverse lenticular structure 21, formed using a replication technique, is provided between the substrates 13, 15, adjacent to an upper one of the substrates 13. Nematic liquid crystal material 23 is also provided between the substrates 13, 15, adjacent to the lower one of the substrates 15. The inverse lenticular structure 21 causes the liquid crystal material 23 to assume parallel, elongate lenticular shapes, between the inverse lens structure 21 and the lower substrate 15, as shown in the Figure. Surfaces of the inverse lenticular structure 21 and the lower substrate 15 that are in contact with the liquid crystal material 23 are also provided with an orientation layer (not shown) for orientating the liquid crystal material 23.

In use, the known switchable display device 1 shown in FIG. 1 is operable to provide a display output, discrete portions of which can be switched either alone, or in combination, between two-dimensional and three-dimensional display modes. In this way, one or more three-dimensional display windows can be provided in a two-dimensional display area.

Switchability of discrete portions of the display output between the modes is achieved by applying an electric field across the lenticular elements formed of liquid crystal material 23. This electric field is generated by applying an electrical potential across electrodes of the electrode layers 17, 19.

The electrical potential is applied to a selected number of adjacent ones of the elongate electrodes in each electrode layer 17, 19. The selection of the upper electrodes defines a height of a display window that is to be switched, and the selection of the lower electrodes defines a width of the display window to be switched.

The applied electrical potential causes the lenticular elements in the selected portion of the display area to switch between maintaining and removing a light output directing function, which will now be explained with reference to FIGS. 3A and 3B.

Figure 3A:
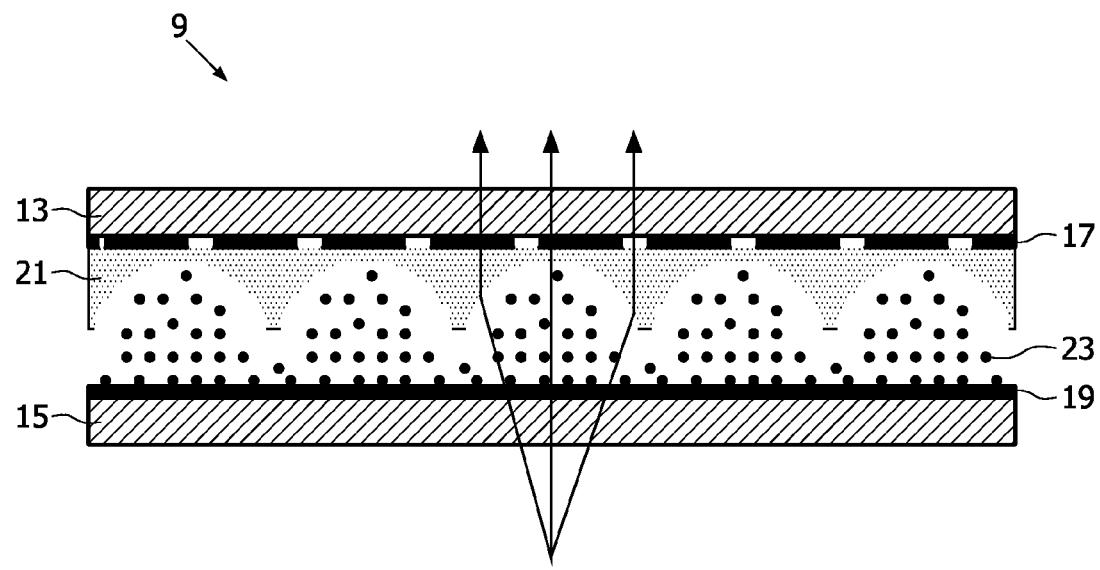
FIGS. 3A and 3B are used to explain the operating principle of the known display device shown in FIG. 1.

FIG. 3A is a schematic cross-sectional view of a portion of the lenticular element arrangement 9 when no electric potential is applied to the electrodes. In this state, the refractive index of the liquid crystal material 23 for light of a polarization provided by the display panel is substantially higher than that of the inverse lenticular structure 21, and the lenticular shapes therefore provide the light output directing function, as illustrated.

Figure 3B:
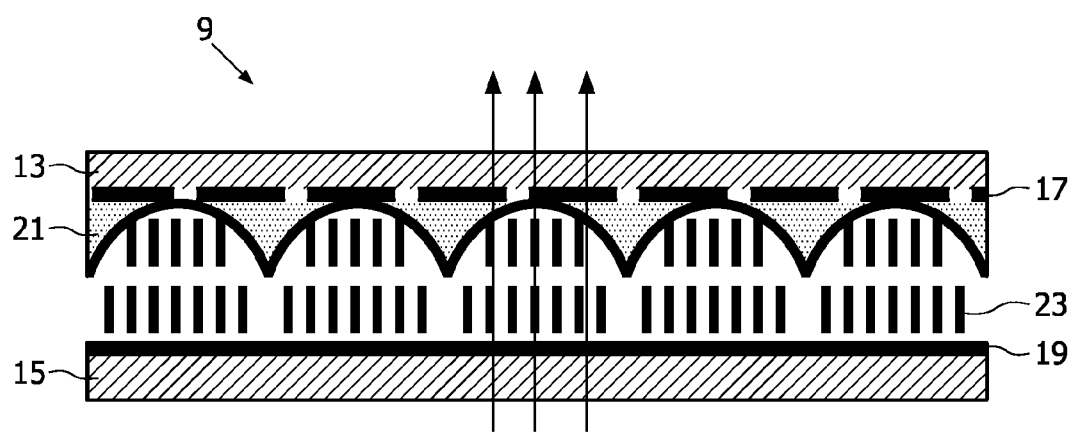

FIG. 3B is a schematic cross-sectional view of a portion of the lenticular element arrangement 9 when an alternating electric potential of approximately 50 volts is applied to the electrodes. In this state, the refractive index of the liquid crystal material 23 for light of the polarization provided by the display panel is substantially the same as that of the inverse lenticular structure 21, so that the light output directing function of the lenticular shapes is cancelled, as illustrated. Thus, in this state, the array effectively acts in a "pass through" mode.

With the light output directing function maintained, as shown in FIG. 3A, the lenticular elements defined by the liquid crystal material 23 act as convex cylindrical lenses, and provide different images, or views, from the display panel 3 to the eyes of a user positioned in front of the display device 1. Thus, a three-dimensional image can be provided.

With the light output directing function removed, as shown in FIG. 3B, the lenticular elements defined by the liquid crystal material 23 act in a "pass through" mode, i.e. as if they were a flat sheet of as convex cylindrical lenses. Thus, a high resolution two-dimensional image can be provided employing the full native resolution of the display panel 3.

The electrical potential to switch between display modes is provided to the electrodes of the lenticular element arrangement 9 by a controller 12.

Further details of the structure of the known display device 1 described above can be found in U.S. Pat. No. 6,069,650, the entire content of which is incorporated herein by reference.

The known display device 1 described above is operable to provide one or more three-dimensional display windows in a two-dimensional display area. The size and position of the display windows can be adjusted simply by altering the selection of electrodes of the lenticular arrangement 9 to which the electrical potential is applied.

It has been found that an undesirable array of lines or a moiré-like pattern is observable across a switched display window of the above described display device 1. The array of lines or moiré-like pattern has been found to be caused by irregularities in the electric field when multiple electrodes in each electrode layers 17, 19 are addressed. In particular, it has been found that the gaps between the adjacent electrodes cause non-uniformities in the electric field within the liquid crystal material 23, which result in inconsistent refractive index switching.

The invention provides a switchable display device of the type shown in FIG. 1, but which does not suffer from the imposition of stripes or a moiré-like pattern when an electrical potential is applied.

An embodiment of a switchable display device according to the invention will now be described. The switchable display device according to the invention has the same structure as that shown in FIG. 1, and a separate Figure is not therefore provided. Thus, the device comprises a liquid crystal display panel 3, a light source 7 and a controller 12, detailed descriptions of which are provided above.

The device according to the invention also comprises a lenticular element arrangement positioned over the display side of the display panel 3, as shown in FIG. 1. The lenticular element arrangement of the device according to the invention provides the same function as that shown in FIGS. 1 and 2, but its structure is slightly different.

Figure 4:
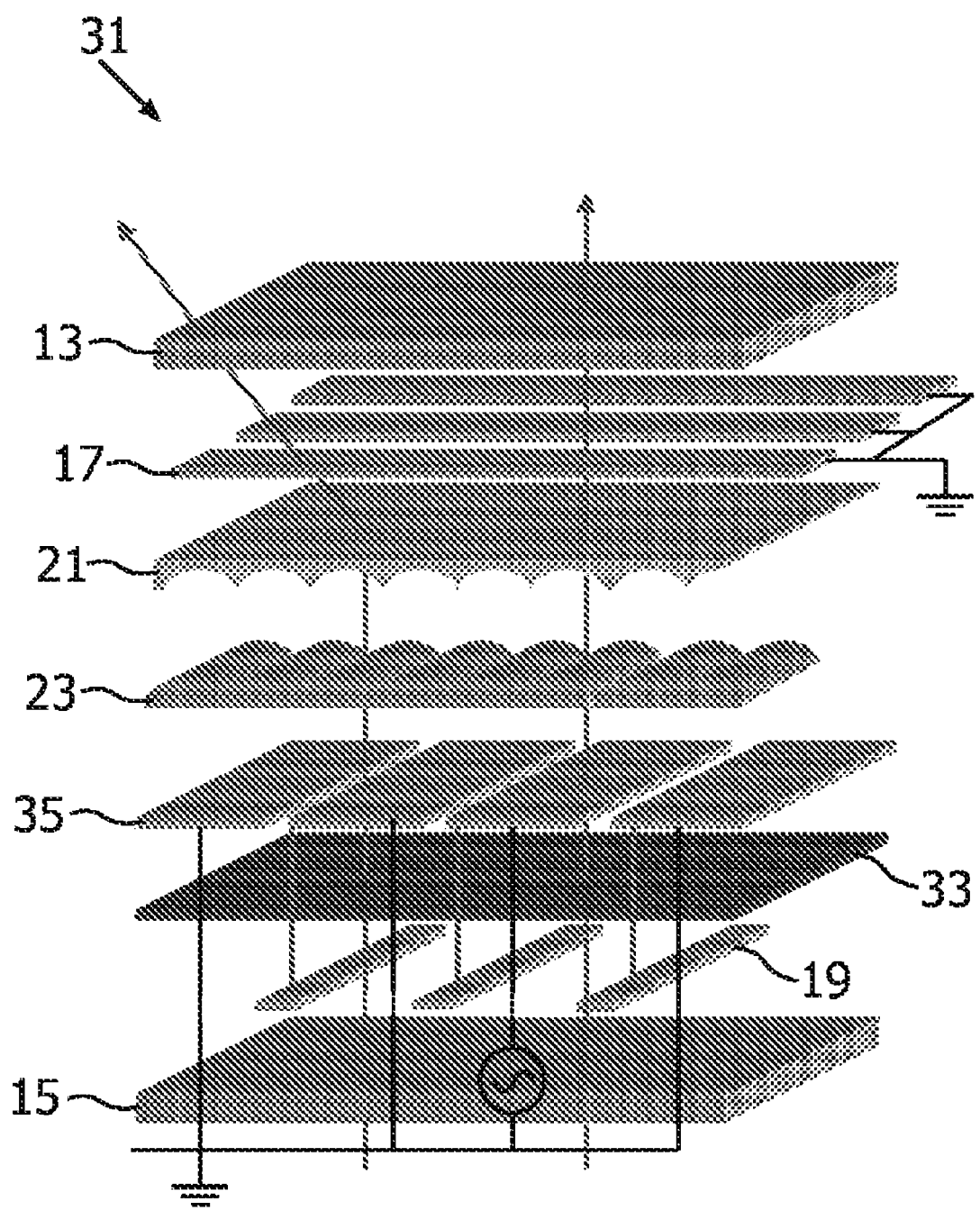
FIG. 4 is a detailed schematic view of an element of an autostereoscopic display device according to the invention.

FIG. 4 schematically shows the structure of the lenticular element arrangement of the device according to the invention. The structure of the arrangement 31 is similar to that of the arrangement 9 shown in FIG. 2, and like reference numerals have been adopted to indicate like structure, where appropriate.

Referring to the Figure, it can be seen that the lenticular element arrangement 31 comprises a pair of transparent glass substrates 13, 15, with transparent upper and lower electrode layers 17, 19 formed of indium tin oxide (ITO) provided on their facing surfaces. The electrode layers 17, 19 each comprise a plurality of spaced apart parallel elongate electrodes. The electrodes of the electrode layers 17, 19 are arranged to be perpendicular to each other.

The arrangement 31 also comprises a dielectric inverse lenticular structure 21 and liquid crystal material 23 provided between the substrates 13, 15. Each of these components are the same as the corresponding components described above with reference to FIG. 2, and a detailed description is therefore omitted.

In contrast to the arrangement 9 shown in FIG. 2, the arrangement 31 of the device according to the invention additionally comprises a dielectric layer 33 and an additional transparent electrode layer 35 provided between the liquid crystal material 23 and the lower substrate 15.

The dielectric layer 33 is substantially flat, is formed of an optically transparent insulator. The dielectric layer 33 may have a thickness in the range 1 μm to 100 μm. The dielectric layer 33 performs the function of spacing the additional electrode layer 35 and the lower electrode layer 19 apart.

The additional electrode layer 35 is formed of indium tin oxide (ITO) and comprises a plurality of spaced apart elongate electrodes. The electrodes of the additional layer 35 are parallel to the electrodes of the lower electrode layer 19. The electrodes of the additional layer 35 are aligned with the gaps between the electrodes of the lower electrode layer 19, and arranged such that, when viewed in plan view, i.e. perpendicular to the display plane, their long edges overlap with each other.

The additional electrode layer 35, the dielectric layer 33 and the lower electrode layer 19 together form a lower electrode arrangement. The upper electrode layer 17 forms an upper electrode arrangement. The electrodes of the lower electrode arrangement are connected together in adjacent pairs, as shown in the Figure, each pair comprising an electrode from each electrode layer 19, 35.

The liquid crystal material 23 assumes parallel, elongate lenticular shapes between the inverse lenticular dielectric structure 21 and the additional electrode layer 35, as shown in the Figure. Surfaces of the inverse lenticular dielectric structure 21, the additional electrode layer 35 and the dielectric layer 33 that are in contact with the liquid crystal material 23 are also provided with an orientation layer (not shown) for appropriately orientating the liquid crystal material 23.

In use, the switchable display device according to the invention is operable to provide a display output in the same way as the known device shown in FIG. 1, and a detailed description will therefore be omitted. The electrodes of the lower electrode layer may, of course, only be addressed in pairs instead of individually.

Thus, discrete portions of the display area can be switched either alone, or in combination, between two-dimensional and three-dimensional display modes. In this way, one or more three-dimensional display windows can be provided in a two-dimensional display area.

In use of the display device according to the invention, the undesirable array of stripes or moiré-like pattern that was observable across switched display windows of the known display device 1 shown in FIG. 1 is not present. Instead, switched display windows having a consistent brightness across the display area are observable.

The array of stripes or moiré-like pattern is avoided in the display device according to the invention by providing a lower electrode arrangement comprising two electrode layers 19, 35 separated by a dielectric layer 33. The electrodes in the lower electrode arrangement are addressed in pairs, each comprising an electrode either side of the dielectric layer 33. The electrodes of each pair are staggered, when viewed in a plan view, and this ensures that a more consistent electric field is generated in the liquid crystal material 23. The electric field inconsistencies that are usually present around the gaps between electrodes are avoided.

A specific embodiment of the invention has been described above. However, it will be apparent to those skilled in the art that various changes and modifications may be made to the embodiment, without departing from the scope of the invention.

For example, a display device having two-dimensional display windows in a three-dimensional display has been described above. However, it will be apparent to those skilled in the art that a device according to the invention could have three-dimensional display windows in a two-dimensional display.

Similarly, the display device described above comprises liquid crystal material having upper convex surfaces in contact with a dielectric structure having lower concave surfaces. However, in alternative embodiments, the liquid crystal may have concave surfaces and the dielectric structure may have convex surfaces. The relative positions of the liquid crystal material and the dielectric structure may also be swapped around with respect to the display panel.

The embodiment described above employs a liquid crystal display panel having, for example, a display pixel pitch in the range 50 μm to 1000 μm. However, it will be apparent to those skilled in the art that alternative types of display panel may be employed, such as organic light emitting diode (OLED) or cathode ray tube (CRT) display devices.

The embodiment described above comprises a separate and distinct lenticular element arrangement. However, in some embodiments, substrates of the components could be combined to reduce the part count.

The display device described above may employ lenticular elements that are slanted at an acute angle to the column direction of the display pixels, as is known in conventional autostereoscopic display devices.

The display device described above comprises a lower electrode arrangement in which a pair electrode layers are separated by a dielectric layer, and an upper electrode arrangement simply comprising a single electrode layer. In this device, electric field inconsistencies are present around the gaps between electrodes of the upper electrode arrangement, but these inconsistencies do not extend beyond the adjacently positioned inverse lenticular structure, and they do not therefore affect the refractive index switching of the liquid crystal material. In alternative embodiments, however, the upper electrode arrangement may have the same structure as the lower electrode arrangement, namely of two electrode layers separated by a dielectric layer.

In the display device described above, the electrodes of the lower electrode arrangement are connected together in pairs, which pairs are then addressed with an electrical potential in order to locally switch the display area between two-dimensional and three-dimensional modes. However, in alternative embodiments, the electrodes may not be connected in pairs. Instead, only the electrodes of the additional electrode layer may be addressed with the electrical potential, with all of the electrodes of the lower electrode layer being connected together and to an electrical potential. This electrical potential may be tuned at the factory to a fixed value to minimize electric field inconsistencies. Alternatively, the electrical potential may be user adjustable, or feedback circuitry may be provided for maintaining an optimal electrical potential for minimizing the electric field inconsistencies.

The embodiment described above comprises parallel, elongate electrodes for applying the electric field to the lens elements. However, the electrodes may take any form.

In the description above, the phrase "lens element" is used. This term is intended to mean any element capable of providing a lens function, for example by having a non-flat (convex or concave) boundary with a material having a different refractive index.

The invention claimed is:

1. A lenticular element arrangement comprising:
   an array of lens elements for directing the light output, the lens elements comprising an electro-optic material whose refractive index is switchable by selective application of an electric field between a first value that maintains the light output directing function and a second value that removes the light output directing function; and
   electrode arrangements provided above and below the lens elements for applying the electric field across the lens elements, wherein at least one of the electrode arrangements comprises first and second electrode layers separated by a dielectric layer, each electrode layer comprising a plurality of electrodes in which each pair of adjacent electrodes of said plurality of electrodes are separated from each other by a gap, wherein an electrode in the first electrode layer is aligned with a corresponding gap of the second electrode layer for each electrode in the first electrode layer, such that the effect of the gaps on the electric field in the lens elements is reduced.

2. The lenticular element arrangement according to claim 1, wherein the electrodes are parallel elongate electrodes.

3. The lenticular element arrangement according to claim 1, wherein the electrodes of the electrode layer positioned further from the lens elements are electrically connected together.

4. The lenticular element arrangement according to claim 1, wherein the electrodes of each electrode layer are at least as wide as the gaps of the other electrode layer.

5. The lenticular element arrangement according to claim 1, wherein a spacing between the electrode layers is less than a maximum gap between the electrodes of each electrode layers.

6. The lenticular element arrangement according to claim 1, wherein first and second ones of the electrode arrangements face profiled and substantially flat surfaces of the lens elements, respectively.

7. The lenticular element arrangement according to claim 1, wherein electrodes of the first electrode arrangement are provided perpendicular to electrodes of the second electrode arrangement.

8. The lenticular element arrangement according to claim 1, wherein the second electrode arrangement comprises the first and second electrode layers separated by the dielectric layer, the first electrode arrangement comprising a single electrode layer.

9. The lenticular element arrangement according to claim 1, further comprising a controller for selectively applying an electrical potential to selected electrodes of the first and second electrode layers for applying the electric field across the lens elements.

10. A switchable autostereoscopic display device, comprising:
    a display panel having an array of display pixels for producing a display, the display pixels being arranged in rows and columns; and
    a lenticular element arrangement including:
       an array of lens elements for directing the light output, the lens elements comprising an electro-optic material whose refractive index is switchable by selective application of an electric field between a first value that maintains the light output directing function and a second value that removes the light output directing function; and
       electrode arrangements provided above and below the lens elements for applying the electric field across the lens elements, wherein at least one of the electrode arrangements comprises first and second electrode layers separated by a dielectric layer, each electrode layer comprising a plurality of electrodes in which each pair of adjacent electrodes of said plurality of electrodes are separated from each other by a gap, wherein an electrode in the first electrode layer is aligned with a corresponding gap of the second electrode layer for each electrode in the first electrode layer such that the effect of the gaps on the electric field in the lens elements is reduced,
    wherein the lenticular arrangement is provided over the display panel for directing light output of the display pixels to provide a stereoscopic image.

* * * * *